United States Patent [19]

Pratt et al.

[11] Patent Number: 5,131,107
[45] Date of Patent: Jul. 21, 1992

[54] METHOD OF MAKING A BLIND FASTENER

[75] Inventors: John D. Pratt, Rancho Cucamonga; Mario A. Zermeno, Garden Grove, both of Calif.

[73] Assignee: Textron Inc., Providence, R.I.

[21] Appl. No.: 734,589

[22] Filed: Jul. 23, 1991

Related U.S. Application Data

[60] Division of Ser. No. 550,974, Jul. 11, 1990, Pat. No. 5,052,870, which is a continuation-in-part of Ser. No. 472,897, Jan. 31, 1990, Pat. No. 5,056,973, which is a continuation-in-part of Ser. No. 421,829, Oct. 16, 1989, abandoned.

[51] Int. Cl.$^5$ ............................................. B21K 23/00
[52] U.S. Cl. ..................................... 10/27 R; 411/43
[58] Field of Search ................. 10/27 R; 29/523, 525, 29/525.1, 525.2; 411/34, 43, 70, 35, 36, 37, 38, 39, 40, 41, 43, 44, 46, 55, 56, 70, 500, 501, 360, 361, 45, 511

[56] References Cited

U.S. PATENT DOCUMENTS

| | | |
|---|---|---|
| 2,030,171 | 2/1936 | Huck . |
| 2,114,493 | 4/1938 | Huck . |
| 2,372,222 | 3/1945 | Mullgardt . |
| 2,456,355 | 12/1948 | Aber . |
| 3,148,578 | 9/1964 | Gapp . |
| 3,292,482 | 12/1966 | Fry et al. . |
| 3,302,510 | 12/1967 | Gapp . |
| 3,377,908 | 4/1968 | Stau et al. . |
| 3,390,601 | 7/1968 | Summerlin . |
| 3,489,056 | 1/1970 | Blakeley . |
| 3,491,649 | 1/1970 | Smouton et al. . |
| 4,012,984 | 3/1977 | Matuschek . |
| 4,046,053 | 9/1977 | Alvi et al. . |
| 4,137,817 | 2/1979 | Siebol . |
| 4,143,580 | 3/1979 | Luhm . |
| 4,407,619 | 10/1983 | Siebol . |
| 4,451,189 | 5/1984 | Pratt . |
| 4,765,787 | 8/1988 | Briles . |
| 4,810,142 | 3/1989 | Briles . |
| 4,897,004 | 1/1990 | Norton . |
| 4,919,576 | 4/1990 | Louw et al. ........................... 411/34 |
| 4,936,725 | 6/1990 | Eshraghi ............................... 411/43 |

Primary Examiner—Lowell A. Larson
Assistant Examiner—Michael J. McKeon
Attorney, Agent, or Firm—Knobbe, Martens, Olson & Bear

[57] ABSTRACT

A method for making blind fastener which comprises a fastener body, a stem and a shaped shear ring wire. The shear ring in one embodiment is disposed in an annular groove disposed intermediate the ends of a neck of the stem. When the fastener is installed, a bulbing portion of the shear ring upsets the tail end of the fastener and then shears at a predetermined load. An anchor portion of the shear ring travels through the fastener body, with the stem neck radially expanding the fastener to fill the hole within the workpieces being secured together. A lock ring groove is formed in the stem midsection of smaller diameter at the intersections of the stem neck and midsection. In another embodiment, the shear ring is positioned at the intersection so that the shear ring anchor portion engages the rear of a lock ring positioned in said lock ring groove.

11 Claims, 4 Drawing Sheets

METHOD OF MAKING A BLIND FASTENER

RELATED APPLICATIONS

This is a division of U.S. Pat. Application Ser. No. 550,974 filed Jul. 11, 1990, now U.S. Pat. No. 5,052,870 which is a continuation-in-part of U.S. Pat. Application Ser. No. 472,897 filed Jan. 31, 1990, which is a continuation-in-part of U.S. Pat. Application Ser. No. 421,829, filed Oct. 16, 1989.

FIELD OF THE INVENTION

The present invention relates generally to a method of making blind fasteners, wherein the blind end of the fastener sleeve is bulbed outwardly to secure one end of the fastener.

BACKGROUND OF THE INVENTION

Blind fasteners, or rivets, as well known in the art, are utilized in fastening components in which only one side of the workpiece is accessible. U.S. Pat. No. 3,148,578 to Gapp describes a fastener assembly comprising a fastener body in the form of a stem within the fastener body. One end of the stem has serrations for engagement by a pulling tool. The opposite end of the stem has an upsetting head. Adjacent the tail end of the sleeve is a shear ring, integrally formed with the stem.

In operation, the Gapp assembly is inserted through aligned holes in the superposed workpieces to be secured together. A tool is used to pull the stem axially away from the workpiece, while a reactionary force is applied against a head of the sleeve. During this first part of the pulling operation, the shear ring axially compresses the sleeve which causes radial expansion of the tail end of the sleeve and bulbing on the blind side of the superposed plates. The shear ring is constructed to shear from the stem at a predetermined tension on the stem, thereby limiting the amount of clamping compression on the superposed plates to a predetermined value. Continued pulling causes a lock ring groove in the stem to reach the sleeve head where a lock ring is deformed into the groove. Pulling increases the load, causing the stem extending beyond the accessible face of the workpiece to break away.

Shear rings integrally formed with the mandrel stem suffer from many manufacturing disadvantages. In one method of forming a shear ring integral with the stem, a piece of material having a diameter at least equal to the desired size of the shear ring is machined using cutting tools to form the shear ring. Such a process is not only time consuming, but also produces a large amount of scrap, or wasted material. In addition to the difficulties associated with the actual formation of the integral shear ring, there are also problems associated with tool wear. As the cutting tools become dull and worn, slight variations in the dimensions of the shear ring tend to appear. This is undesirable in that such variations make the fastener somewhat less reliable because the forces required to bulb the sleeve and shear the shear ring are less predictable. Thus, frequent tool sharpening or tool replacement is needed.

It is possible to form stems with integral shear rings by heading or coining but this is somewhat difficult because of the wide variation in diameters and because of an acute angle adjacent the ring.

Because the shear ring of a blind rivet is designed to shear at a predetermined force after forming the blind head, limitations are necessarily imposed on the axial width of the shear ring. In order to carve out a wedge shaped portion of the sleeve, prior integral shear rings have been manufactured with an included angle at the base of the shear ring, proximate the mandrel stem. This included angle portion of the shear ring presents a cutting surface on the leading edge of the shear ring. In operation, this type of shear ring first gouges the tail end of the sleeve so as to create a wedge therein. This wedge facilitates bulbing of the sleeve. After forming a blind head, the shear ring is sheared from the stem. Such an operation requires a large initial pulling force, and thins the walls of the tail end of the sleeve.

U.S. Pat. No. 3,390,601 Summerlin discloses a blind fastener employing a separate collar which is positioned between an enlarged portion on the blind end of a stem and the blind end of the sleeve. The leading portion of the collar extends inwardly adjacent to a shoulder formed by the enlarged end of a stem and an adjacent reduced diameter portion of the stem. Forming the collar as a separate element, as opposed to having it formed integral with the portion of the stem, as in the above-mentioned Gapp patent, has the advantage of allowing the collar to be made of material different from the stem and to be fabricated separately from the stem. This, in turn, provides manufacturing advantages. A major disadvantage of the Summerlin fastener, however, is that the necessary lock ring groove in the stem extends inwardly from a reduced diameter portion of the stem. Consequently, a break groove in the stem, which causes the stem to break after it is installed, has to have a diameter which is yet smaller than the lock groove. Consequently, this construction undesirably limits the load which may be applied to the stem. Further, the important shear strength of the fastener is reduced to the combined shear strength of the stem at its breakneck groove and the surrounding softer sleeve. Also, modifying the design to increase its shear strength would appear to undesirably increase the blind side protrusion of the stem. This may prevent installation of such a modified fastener in situations wherein space is limited on the blind side of the fastener.

In view of the foregoing, a need exists for an improved method of making blind fastener of the type incorporating a shear ring in the fastener setting operation.

SUMMARY OF THE INVENTION

Briefly stated, the present invention comprises forming an elongated stem for a blind fastener, the stem having an enlarged blind end, an adjacent cylindrical neck, an adjacent midsection with a diameter smaller than the neck diameter, and an annular groove disposed within the neck spaced from the junction of the mid section and the neck. The invention further includes providing a tubular fastener body for receiving said stem with the neck fitting closely within a tail end of the fastener body. The method of the invention further includes positioning an anchor portion of a shear ring in the annular groove, the bulbing portion of the ring extending radially beyond the stem neck. The stem is inserted into the fastener body up to the point where the bulbing portion of the shear ring engages the tail end of the fastener body.

In use, the fastener body is inserted through a workpiece. When the blind end of the stem is drawn towards the fastener body, the bulbing portion of the shear ring forms a blind head on the fastener body, and when a predetermined stem pulling load is reached, the bulbing portion of the ring is sheared from the anchor portion.

The invention further includes forming a lock groove in the fastener stem at the forward edge of the neck, with the forward surface of the neck forming a shoulder that is the rear wall of the lock groove. In setting the fastener, a forward portion of the lock ring is wedged into an additional lock ring formed in the head end of the fastener body.

In a short version of the fastener, the shear ring groove is formed adjacent to the lock ring groove so that the shear ring and the lock ring are positioned side by side. That is, the shear ring engages the shoulder and the forward edge of the shear ring anchor portion is engaged by the lock ring. Thus, the anchor portion forms, in effect, a shoulder for the lock ring, or a wall of the lock groove.

In a preferred form of the invention, the positioning of the shear ring is accomplished by wrapping a wire of the desired shape into the shear ring groove. An advantage of this is that it reduces manufacturing costs and provides a more uniform. geometry from lot to lot because one coil of shaped wire is capable of wrapping many lots of fastener stems. Thus, there is less variation in the axial dimension of the shear ring, resulting in a very reliable prediction of the forces required to shear the shear ring. Because the shear ring is not integral with the stem, its composition is not limited to the material used to form the stem. Therefore, the shear ring may be formed of various types of materials, all of which can be used with the same mandrel stem to provide fasteners of various strengths depending on the particular application. This is particularly beneficial from a manufacturing standpoint in that a single lot of mandrel stems can be wrapped with any one of a number of precise shear ring wires to produce a wide variety of fasteners.

Preferably, the shear ring is shaped with a leading edge in a wedge formation, which has been shown to yield superior sheet clamp-up. Since the shear ring is fabricated separately from the stem, the desired wedge shape is obtained without the difficult machining or gouging of the sleeve as with the integral design of the fastener described above in the Gapp patent. Nonetheless, during installation of the fastener, this separate ring, like the integral shear ring, upsets the blind head and then shears. The large diameter bulbing portion of the separate shear ring then remains in place while the smaller diameter anchor portion continues traveling through the sleeve with the stem.

BRIEF DESCRIPTION OF THE DRAWINGS

Further objects features and advantages of the instant invention will become apparent from the ensuing detailed description, when considered with the appended drawings in which.

DETAILED DESCRIPTION OF THE PREFERRED EMBODIMENT

Figure 1:
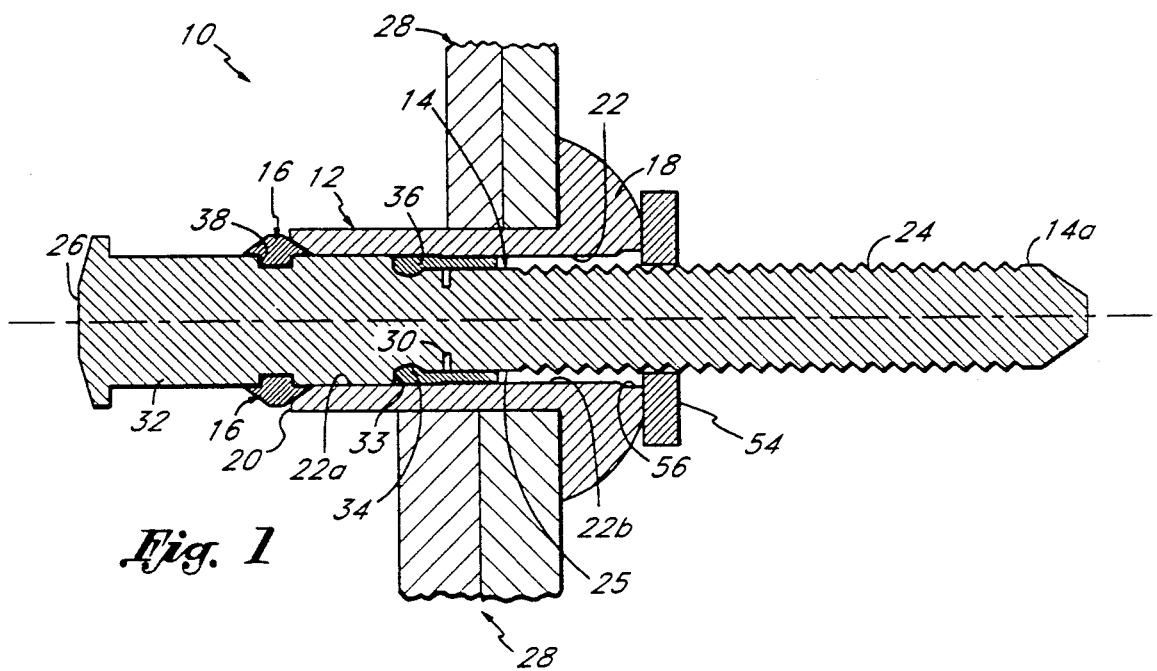
FIG. 1 is a cross-sectional side view of a blind fastener assembly, illustrating a preferred embodiment of the present invention.
Figure 2:
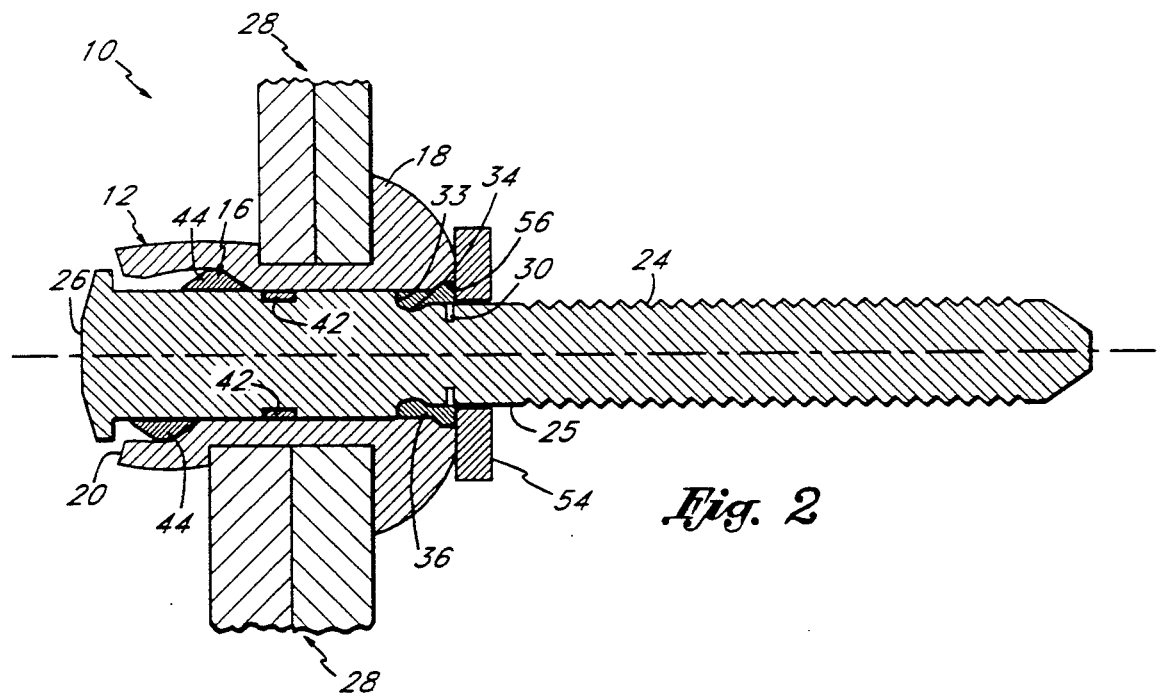
FIG. 2 is a cross-sectional side view of the blind fastener assembly of FIG. 1, installed within a work.

Referring to FIGS. 1 and 2, there is shown generally at 10, a blind fastener assembly comprising a tubular fastener body 12, a stem 14 and a shaped shear ring 16. The fastener body 12 comprises a tubular sleeve having a head 18 at one end, a tail 20 at the opposite end, with the inner diameter of the sleeve tail being tapered or beveled. The sleeve has a bore 22 having a first diameter 22a adjacent the tail of the sleeve and a second, slightly smaller diameter 22b which extends from near the midsection of the sleeve to the head 18, before opening into a larger diameter counterbore or recess 56.

The stem 14 is appreciably longer than the fastener body 12, and has serrations 24 along the end thereof extending from an unserrated midsection 25 of the stem through the stem head to facilitate firm gripping of the fastener by a conventional installation tool (not shown). Opposite the serrated end 14a of the fastener stem 14 is an enlarged head 26.

Adjacent the head 26 of the stem is an elongated neck 32 which is sized to fit closely within the first bore diameter 22a in the sleeve tail 20. In the form of the fastener illustrated in FIG. 1, the neck extends to a length almost equal to the length of the sleeve. The forward end of the neck 32 terminates in an annular locking groove 34, wherein the forward end face of the neck 32 forming a shoulder 33 as a result of the reduced diameter midsection 25 and stem serrated end 24. The locking groove 34 has an inner diameter which is slightly smaller than the stem midsection 25, but is, of course, slightly larger than the diameter of a break groove 30 slightly forward of the lock groove. It should be noted, however, that the lock groove 34 is recessed directly inwardly from the enlarged diameter of the neck 32, such that the inner diameter of the groove 34 is as large as possible. Thus, it is only necessary that the break groove 30 be slightly smaller than the diameter of the lock groove, thereby maximizing the available pulling load which the stem can accommodate. Moreover, the shear strength of the combination of the stem and the fastener body 12 is maximized.

The lock groove 34 is sized to receive a lock ring 46 having an anchor or bead portion which fits into the lock groove and a forward portion surrounding the stem midsection 25 which extends between the enlarged neck 32 and the serrated portion of the stem. Note that the forward portion of the lock ring also surrounds the lock groove 30.

Figure 3:
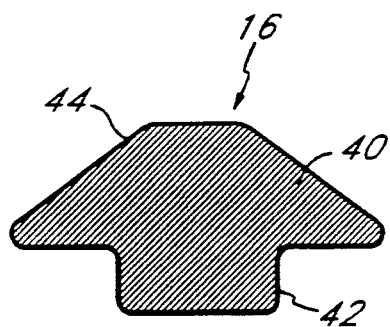
FIG. 3 is an enlarged cross-sectional view of the shear ring shown in FIG. 1.

In accordance with the invention, an annular groove 38 is formed in the neck 32 at a location spaced forwardly from the stem head 26 and rearwardly from the locking groove 34. The shear ring 16 is captured by the groove 38. As seen from the drawings, the shear ring 16 includes a shearable bulbing portion 40 and an anchor portion 42 which has a generally rectangular cross section and fits into the annular groove 38 of the neck 32. As seen in FIGS. 1-3, the bulbing portion 40 has a generally trapezoidal cross-sectional shape, thus having a leading portion that fits within the tapered inner tail end of the fastener body 20 in position to bulb the fastener body tail end when the fastener is installed.

The shear ring groove 38 is preferably larger than the anchor portion 42 of the shear ring 16 so that the anchor portion easily fits within the groove. In one form of the invention, the annular groove 38 has an axial width or dimension which is approximately 8% larger than the dimension of the anchor portion 42, and is nearly 25% deeper than the depth of the anchor portion. This ensures that the bulbing portion 40 of the shear ring is in contact with the neck portion 32 of the stem at the start of the installation process. In addition, by sizing the axial dimension of the annular groove 38 slightly larger than the preferred diameter of the shear ring 16, slightly thicker shear rings may be employed with the same stem dimension.

Some dimensions for an illustrative blind fastener as shown in FIGS. 1–3 are as follows:
 Mandrel neck diameter: 0.132"
 Axial width of annular groove: 0.0335"
 Depth of annular groove: 0.0195"
 Total height of shear ring wire: 0.032"
 Height of anchor portion: 0.0115"
 Axial width of anchor portion: 0.030"
 Angle of leading edge of shear ring: 35°.

Of course, the foregoing dimensions would vary for fasteners of different sizes. Further, for a given fastener, considerable variation is possible. For example, while 35° is desirable for the angle of the leading edge of the shear ring, an angle in the range of 20° to 50° is satisfactory.

Preferably, the shear ring 16 comprises a length of shaped wire, suitable for wrapping around the circumference of the stem. Also possible is a solid machined or formed shear ring which is swaged into the groove.

Figure 4:
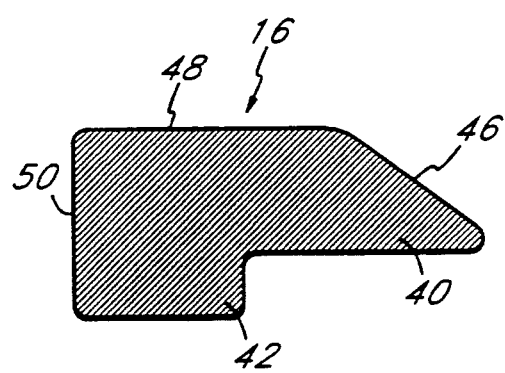
FIG. 4 is a cross-sectional view of a ramp shaped shear ring.

Alternatively, the shear ring 16 may assume a more one-sided shape, as illustrated in cross-section in FIG. 4. In this configuration, the bulbing portion 40 of the shear ring 16 has a wedge-shaped ramp portion 46, terminating in a constant diameter top or outer portion 48. The ramp-shaped shear ring has an anchor portion 42 along the trailing edge 50 of the shear ring, which fits into the annular groove 38 provided in the neck 32 of the stem 14.

Since the trailing edge of the bulbing portion 40 is aligned with the trailing edge 50 of the anchor portion 42, this shape can be used with an annular groove 38 positioned close to the head 26 of the stem 14.

Figure 5:
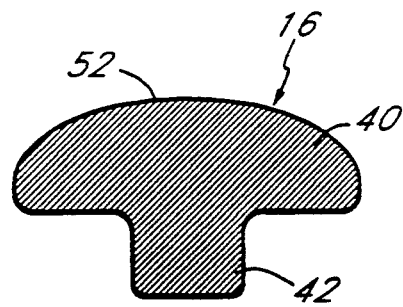
FIG. 5 is a cross-sectional view of a convex mushroom shaped, shear ring.

FIG. 5 illustrates another alternative shape of the shear ring 16. As seen, this configuration is similar to the shape illustrated in FIG. 3, but has a curved outer portion forming a convex, somewhat mushroom-like shape. In one form of the fastener, the radially outer surface of the bulbing portion 52 is formed on a circular radius of approximately 0.040 inches.

Figure 6:
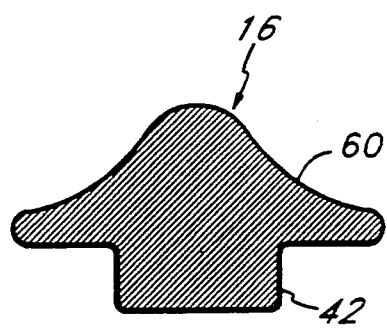
FIG. 6 is a cross-sectional view of a concave mushroom shaped shear ring.

Still another alternative shape of the shear ring 16 is when having a concave mushroom-like bulbing portion 60, as illustrated in FIG. 6. This configuration offers similar advantages as the convex shape of FIG. 5. Each of the different shaped shear ring configurations are suitable in wire form for wrapping around the stem 14, the fastener 10 and the annular groove 38. The shear ring cross sections in FIGS. 3, 5 and 6 have the advantage of being symmetrical so that no orientation is needed in assembly.

In operation, the fastener 10 is inserted through aligned apertures in the workpieces 28 which are to be secured together. A conventional installation tool (not shown) is then employed to pull the stem 14 axially away from the workpieces 28. As the stem 14 is pulled through the fastener body 12, the shear ring 16 is brought into engagement with the tail end 20 of the fastener body. Continued pulling on the stem 14 wedges the tapered leading edge of the shear ring 16 into the tail end 20 of the fastener body 12, causing radial expansion of the fastener body and bulbing on the blind side of the workpieces, as seen in FIG. 2. One side of the drawing illustrates a minimum thickness workpiece and the other maximum thickness for that fastener. When the shear ring encounters the workpiece through the fastener body, the bulbing portion of the shear ring stops moving and the load on the stem increases. When the tension in the stem reaches a predetermined value, the bulbing portion 40 is sheared from the anchor portion 42 and the anchor portion continues moving with the stem, all as seen in FIG. 2. The shear ring shears in somewhat the same manner as does an integral shear ring of the above-described Gapp patent; however, chaffed surfaces at the shear area appear to be reduced. This may be because of the differences in shape and because the anchor portion 42 of the shear ring 16 is shorter than the depth of the annular groove 38.

Continued pulling of the stem causes the stem to slide within the sheared anchor portion 40 until the lock ring 36 meets an anvil washer 54, causing the lock ring to be compressed against the shoulder 33, and causing the leading edge of the lock ring to buckle into the recess 56, as shown in FIG. 2, thereby locking the fastener within the workpiece. Because the anvil washer 54 and the lock ring 36 reacting against the stem shoulder 33 and lock groove 34 prevent further withdrawing movement of the stem 14, the tension on the stem increases, causing it to break along the break groove 30.

The formation of the bulb on the blind side of the fastener body of course draws the workpieces together. Also, as this is occurring, the neck portion 32 starts to enter the smaller diameter portion 22a of the sleeve, causing radial expansion thereof to fill the hole between the fastener body and the workpieces. While the lock ring 36 has been moving in the reduced diameter portion, it is dimensioned to slide easily within the bore and not produce an outward force on the sleeve during that stage of the installation.

While the fastener illustrated in FIGS. 1 and 2 has some range of workpiece thickness which can be accommodated, fasteners are usually provided in a series of different lengths. With the constructions shown, fasteners of different axial lengths can be readily provided for workpieces of different thicknesses. The length of the installation stroke desirable remains essentially the same for each of the various sizes, as correspondingly does the distance between the annular shear ring groove and the stem head 26. The variation in stem length occurs in the dimension between the shear ring groove 38 and the shoulder 34 of the lock ring groove. (Of course, the fastener body is correspondingly varied.) This is important in that it helps the length of the blind side protrusion of the stem constant, which is significant in situations of limited space availability. Further, keeping the setting stroke constant simplifies installation.

Figure 7:
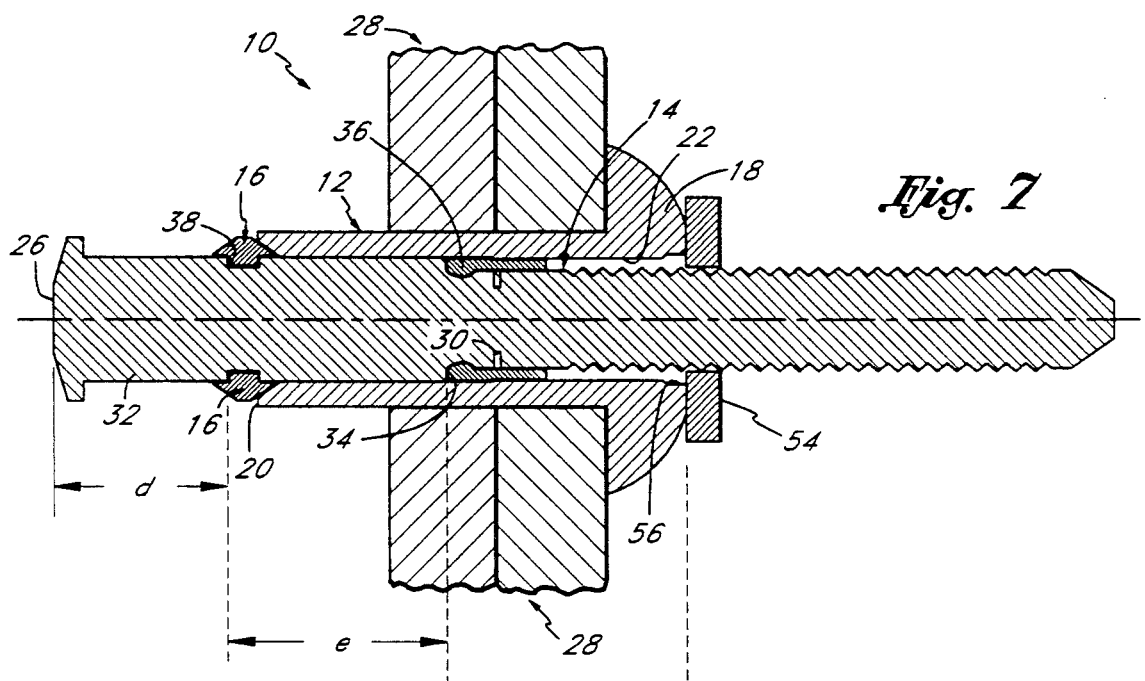
FIGS. 7 and 8 are cross-sectional views illustrating fasteners similar to FIG. 1 but with different lengths.
Figure 8:
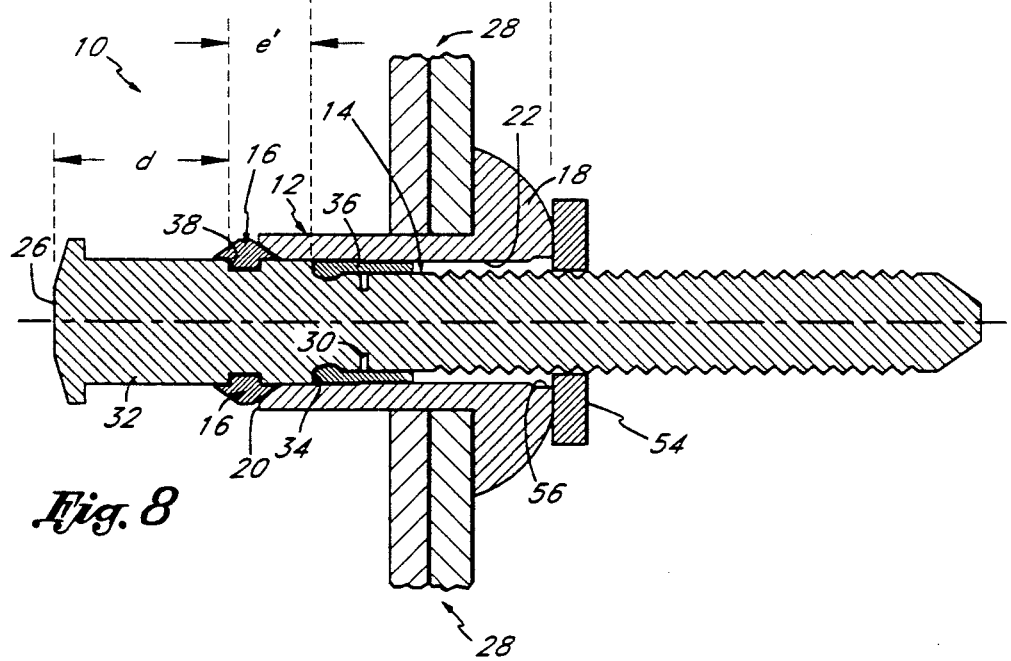

Fasteners of different lengths are illustrated in FIGS. 7 and 8. The FIG. 7 fastener is longer than that of FIG. 1, and the FIG. 8 fastener is shorter than that of FIG. 1. The fasteners are shown vertically aligned to illustrate that the stem dimensional change is between the shear ring groove 38 and the shoulder 33. That is, the dimension d in FIG. 7 and in FIG. 8 is the same, as is dimension f in each figure. However, dimension e and e' are different. With this arrangement, the large diameter stems neck 32 fills the installed fastener body. This maximizes the fastener shear strength, since the stem material is harder than the fastener body material. This arrangement also maximizes the lock groove diameter which in turn maximizes the break groove diameter and the pulling load the stem can handle.

The blind fasteners illustrated have manufacturing advantages over the stem with an integral shear ring. The stem can, after an initial heading step, be formed by a rolling process in which the stem material is displaced by a roller. No machining is required. Of course, the stem can also be machined in a conventional manner. There would not be much material wasted even with a machined approach, since there is no shear ring. Having formed the stem, the shear ring is then assembled within the annular groove on the stem neck. As a final step, the fastener body is slid over the serrated end of the stem so that it frictionally engages a portion of the neck.

Figure 9:
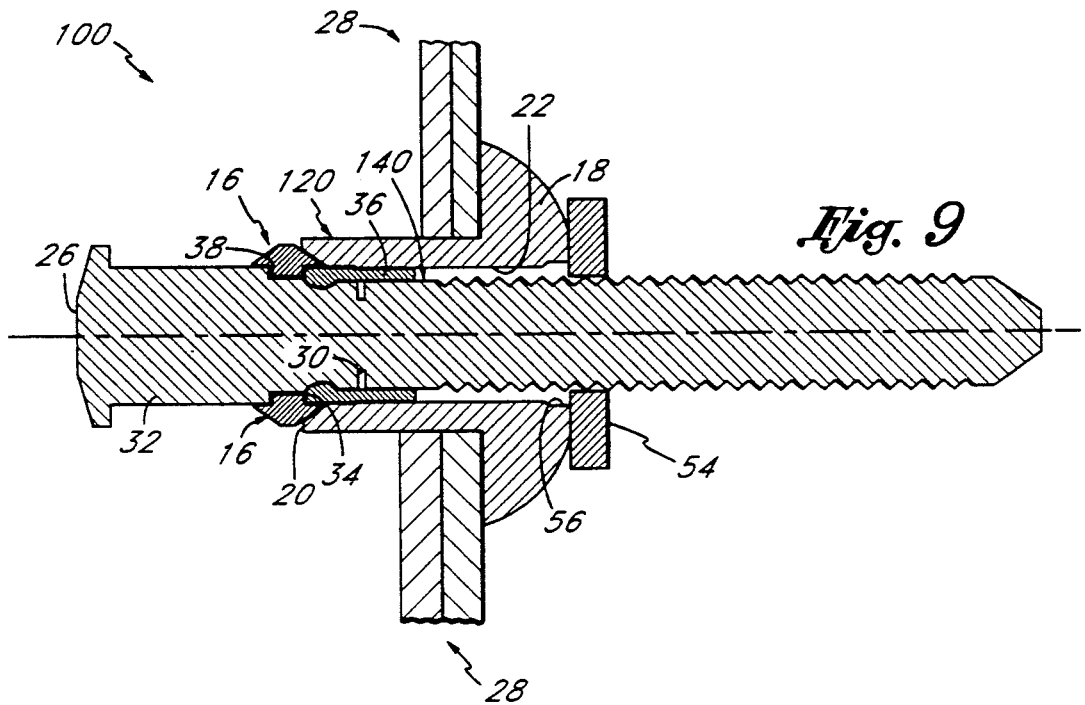
FIG. 9 is a cross-sectional view illustrating the shortest version of the fastener assembly of FIG. 1.

FIG. 9 illustrates a fastener assembly 100 in which a short stem 140 is positioned in a short fastener body 120. The assembly is shorter than the fastener of FIG. 8. In FIG. 9, the forward edge of the shear ring anchor portion 42 engages the rear edge of the lock ring 36. In other words, the shear ring groove 38 opens to the lock groove 34 or; in relating the fastener of FIG. 9 to that of FIG. 8, the dimension e' in FIG. 8 corresponds in FIG. 9 to a dimension about equal to the axial dimension of the shear groove 38, or the anchor portion 42. As in the arrangements of FIGS. 7 and FIG. 8, the distance between the shear ring groove 38 and the stem head 26 remains the same.

Figure 10:
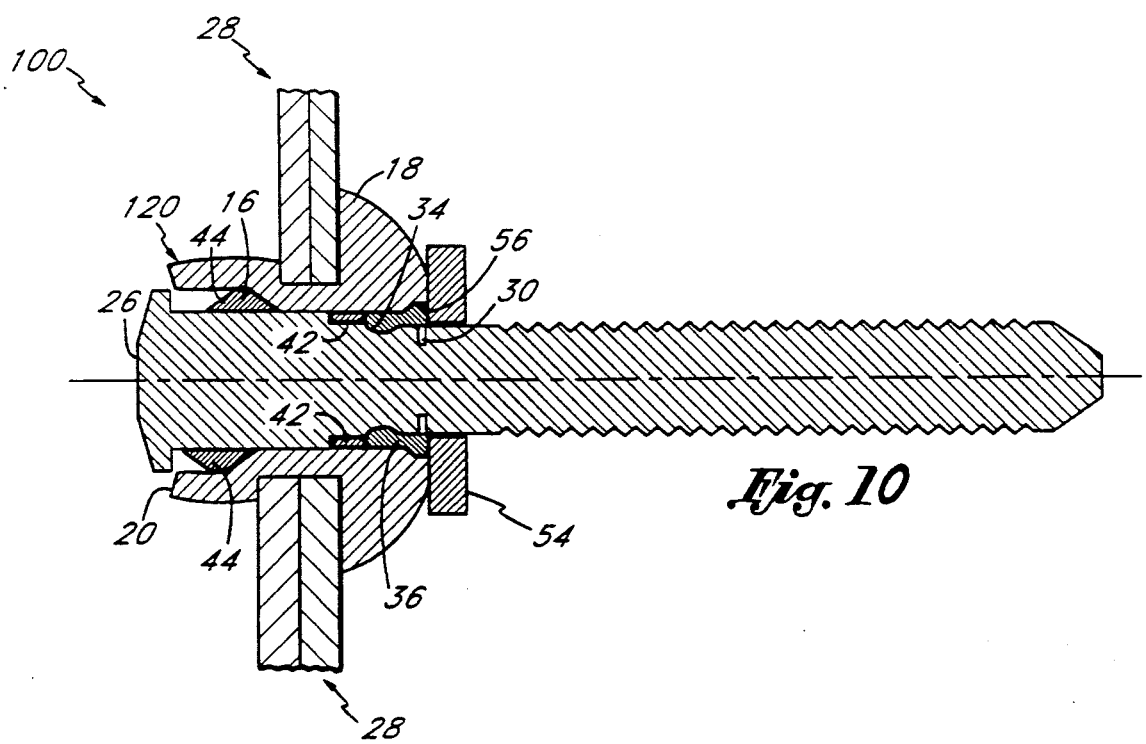
FIG. 10 is a cross-sectional view of the assembly of FIG. 9 after it is set.

When installed, the short fastener appears as shown in FIG. 10. That is, the sheared anchor portion 42 has formed a reaction surface for the installed lock ring. Or more precisely, the anchor portion 42 transmits a portion of the lock ring installing force through the lock ring anchor portion 42 to the rear wall of the shear ring groove 38. Or, stated differently, the rear wall of the shear ring groove can be thought of as a shoulder at the intersection of the stem neck 32 and the midsection 25.

As with the fastener of FIGS. 1 and 2, the fastener 100 is shown schematically installed in workpieces of a certain thickness in the top half of the figure, and installed in thicker workpieces in the bottom half.

Other modifications and alternative embodiments of the invention will be apparent to those skilled in the art in view of the foregoing description. Accordingly, this description is to be construed as illustrative only, and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A method of making a blind fastener comprising the steps of:
    forming an elongated stem having a blind end, an adjacent cylindrical neck, a stem midsection adjacent said neck with a diameter smaller than said neck so that a shoulder is formed at the intersection between said neck and the midsection, and an annular groove disposed within said neck spaced from said shoulder;
    providing a tubular fastener body for receiving said stem; and
    positioning an anchor portion of a shear ring in said groove with a bulbing portion of said ring extending radially beyond said stem to expand said fastener body so as to form a blind head on said body when said blind end of said stem is drawn toward said body and to shear at a predetermined stem pulling load.

2. The method of claim 1, including the step of forming said bulbing portion of said ring with a cross section having a trapezoidal shape.

3. The method of claim 1, including the step of forming said bulbing portion of said ring with a wedge shaped leading edge adapted to be wedged within the end of said body.

4. The method of claim 1, including the step of forming said bulbing portion of said ring with a cross section having a convex radiused bulbing portion.

5. The method of claim 1, wherein said ring is made of wire, and said positioning step includes wrapping the wire into said groove with a bulbing portion of said wire extending radially beyond said stem.

6. The method of claim 1, including the step of forming a lock ring groove in said midsection at said shoulder.

7. The method of claim 6, including positioning a lock ring in said lock ring groove.

8. A method of making a blind fastener, comprising the steps of:
    forming an elongated stem having a blind end, an adjacent cylindrical neck, a stem midsection adjacent said neck with a diameter smaller than said neck, an annular groove in said neck adjacent said midsection;
    positioning a lock ring around said stem midsection adjacent a leading edge of said groove;
    positioning an anchor portion of a shear ring in said groove engaging said lock ring, said shear ring being separate from said lock ring and having a bulbing portion extending radially outwardly beyond said stem; and
    inserting said stem into a tubular fastener body to the point where said lock ring is within said body, and said shear ring bulb portion engages the rear of said fastener body so that said bulbing portion will expand said fastener body when said stem blind end is drawn further into said body and will shear at a predetermined stem pulling load.

9. The method of claim 8, including the step of forming a lock ring groove in said midsection adjacent to said shear ring, and said lock ring positioning step includes positioning said lock ring in said lock ring groove in engagement with said shear ring anchor portion.

10. A method of making a blind fastener, comprising the steps of:
    forming an elongated stem having a blind end, an adjacent cylindrical neck, a stem portion adjacent said neck with a diameter smaller than said neck, whereby a forward face of said neck creates a shoulder, and an annular lock ring groove in said stem, said groove having a rear wall spaced forwardly from said shoulder;
    positioning an anchor portion of a shear ring surrounding said stem reduced portion and engaging said shoulder, with a bulbing portion of said shear ring extending radially outwardly beyond said neck, and with a forward surface of said anchor portion substantially radially aligned with said rear wall of said lock ring groove; and inserting said stem into a tubular fastener body to the point where said shear ring bulbing portion engages the rear of said fastener body so that said bulbing portion will expand and deform said fastener body when said stem blind end is drawn further into said body and will shear at a predetermined stem pulling load.

11. The method of claim 10, including the step of utilizing a forward surface of said shear ring bulbing portion as a stop to limit rearward movement of a lock ring and maintain portions of a lock ring in said lock ring groove when said fastener is fully set.

* * * * *